(12) United States Patent
DeLuga

(10) Patent No.: US 6,768,652 B2
(45) Date of Patent: Jul. 27, 2004

(54) MULTISTAGE UNDOCKING ASSEMBLY AND SYSTEM AND METHOD INCORPORATING SAME

(75) Inventor: Ronald E. DeLuga, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/244,214

(22) Filed: Sep. 16, 2002

(65) Prior Publication Data

US 2004/0052062 A1 Mar. 18, 2004

(51) Int. Cl.[7] .............................. H05K 7/14; H05K 7/18
(52) U.S. Cl. ...................... 361/801; 361/686; 361/726; 361/725
(58) Field of Search ................................. 361/801, 686, 361/724, 725, 759, 740, 732, 726, 747, 752; 439/341, 372, 142

(56) References Cited

U.S. PATENT DOCUMENTS

| | | | | |
|---|---|---|---|---|
| 5,818,691 A | * | 10/1998 | McMahan et al. | 361/686 |
| 5,928,017 A | * | 7/1999 | Lan | 439/159 |
| 6,185,095 B1 | * | 2/2001 | Helot et al. | 361/686 |
| 6,264,488 B1 | * | 7/2001 | Helot et al. | 439/341 |
| 6,315,583 B1 | * | 11/2001 | Nishioka | 439/131 |
| 6,510,051 B2 | * | 1/2003 | Kim | 361/686 |
| 6,549,416 B2 | * | 4/2003 | Sterner et al. | 361/727 |

\* cited by examiner

*Primary Examiner*—Randy W. Gibson
*Assistant Examiner*—Hung S. Bui

(57) ABSTRACT

The present technique provides a multistage undocking mechanism for a system having a portable computing device dockable with a docking device. The multistage undocking mechanism may be disposed in either the portable computing device or the docking device. In a first stage, the multistage undocking mechanism engages a latch assembly to unlatch the portable computing device from the docking device. In a second stage, the multistage undocking mechanism engages a lifter assembly to separate the portable computing device from the docking device at least partially via a manual force applied by the user. The lifter assembly may have one or more spring-loaded lifter mechanisms, such as a spring-loaded lifter having sufficient force to support the portable computing device but insufficient to separate male/female connections between the portable computing device and the docking device.

37 Claims, 4 Drawing Sheets

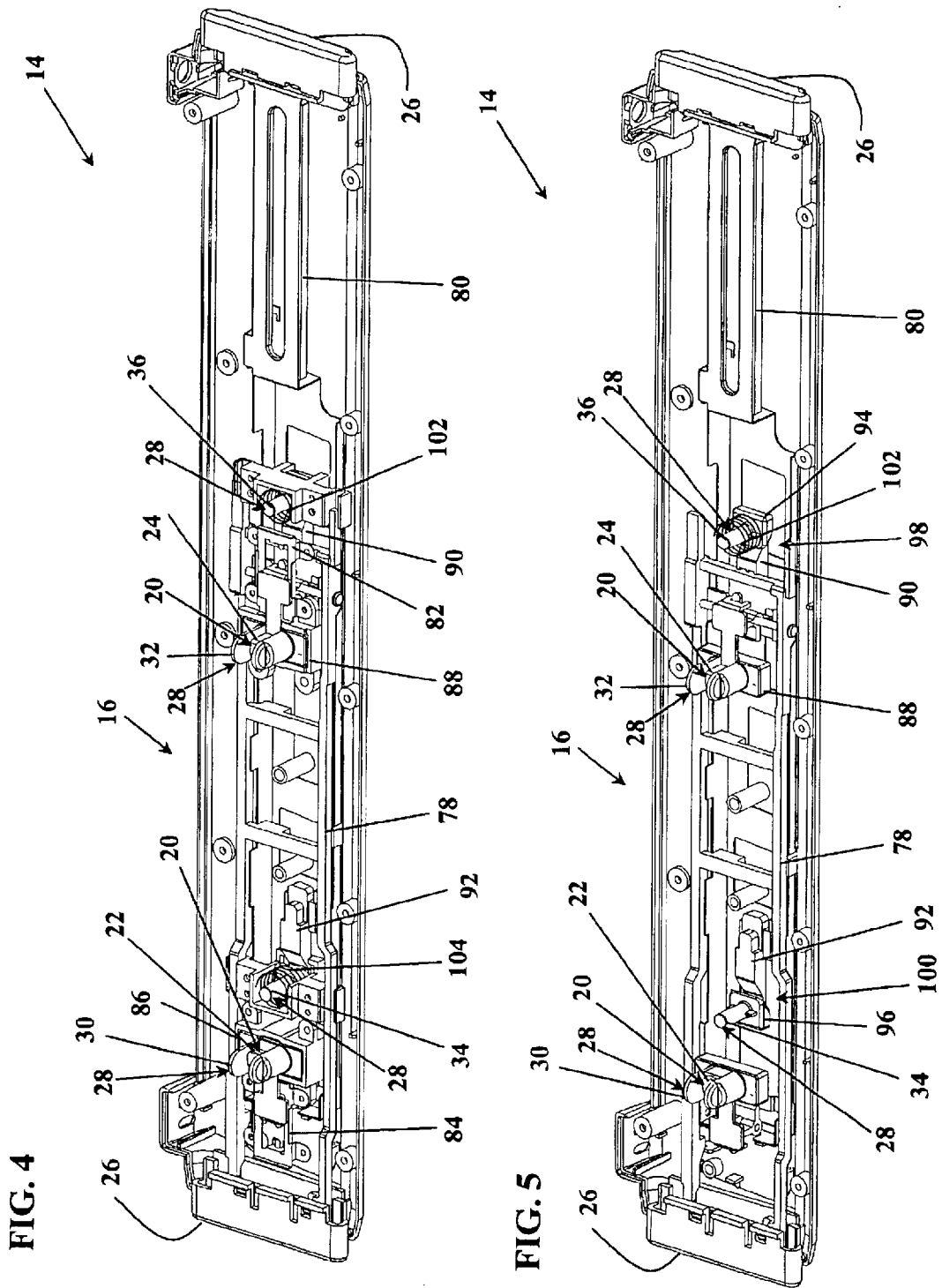

MULTISTAGE UNDOCKING ASSEMBLY AND SYSTEM AND METHOD INCORPORATING SAME

FIELD OF THE INVENTION

The present technique relates generally to computer systems and, more particularly, to docking stations for a portable computer. The present technique provides a multistage undocking assembly, which reduces the spring force and smoothens the ejection of the portable computer from the docking station.

BACKGROUND OF THE INVENTION

This section is intended to introduce the reader to various aspects of art, which may be related to various aspects of the present invention described and/or claimed below. The discussion is believed to be helpful in providing the reader with background information to facilitate a better understanding of the various aspects of the present invention. Accordingly, it should be understood that these statements are to be read in this light, and not as admissions of prior art.

Portable electronic devices, such as laptop computers, are often coupled to a docking station having a variety of communication ports and expansion components. Existing docking stations often have one-stage undocking mechanisms, such as one-stage spring-loaded eject mechanisms, which may be triggered to release and separate the portable electronic device from the docking station. In this one-stage technique, the undocking mechanism must provide sufficient force to overcome the weight of the portable electronic device and various retaining forces holding the portable electronic device to the docking station. For example, each pair of male and female connectors, e.g., communication connectors, may require a considerable amount of force to overcome frictional forces, compressive forces, and various other retaining forces. Accordingly, existing one-stage undocking mechanisms may apply forces of a magnitude far exceeding the weight of the portable electronic device, thereby creating a relatively abrupt and noisy separation of the portable electronic device from the docking station.

Also, many docking stations are designed to accommodate a variety of laptop computers. Therefore, the one-stage undocking mechanisms used in these docking stations include spring-loaded eject mechanisms having a spring force sufficient to accommodate each of the potential laptop computers. Because the weights and retaining forces of docking connectors may vary widely between the different types and configurations of laptop computers, the spring-loaded eject mechanism generally has a high spring force sufficient for all expected configurations. In operation, the spring-loaded eject mechanism moves roughly due to frictional forces created by the high spring force. The spring-loaded eject mechanism also may abruptly eject certain types of laptop computers due to the high spring force, which may far exceed the force required for the weight of the laptop computer.

BRIEF DESCRIPTION OF THE DRAWINGS

Exemplary embodiments will hereafter be described with reference to the accompanying drawings, wherein like reference numerals denote like elements, and:

FIGS. 4 and 5 are partial internal perspective views of the attachable expansion device of FIGS. 1–3 further illustrating the multistage undocking assembly.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present technique provides a multistage undocking mechanism for a system having a portable computing device dockable with a docking device. The multistage undocking mechanism may be disposed in either the portable computing device or the docking device. In a first stage, the multistage undocking mechanism engages a latch assembly to unlatch the portable computing device from the docking device. In a second stage, the multistage undocking mechanism engages a lifter assembly to separate the portable computing device from the docking device at least partially via a manual force applied by the user. The lifter assembly may have one or more spring-loaded lifter mechanisms, such as a spring-loaded lifter having sufficient force to support the portable computing device but insufficient to separate male/female connections between the portable computing device and the docking device.

Figure 1:
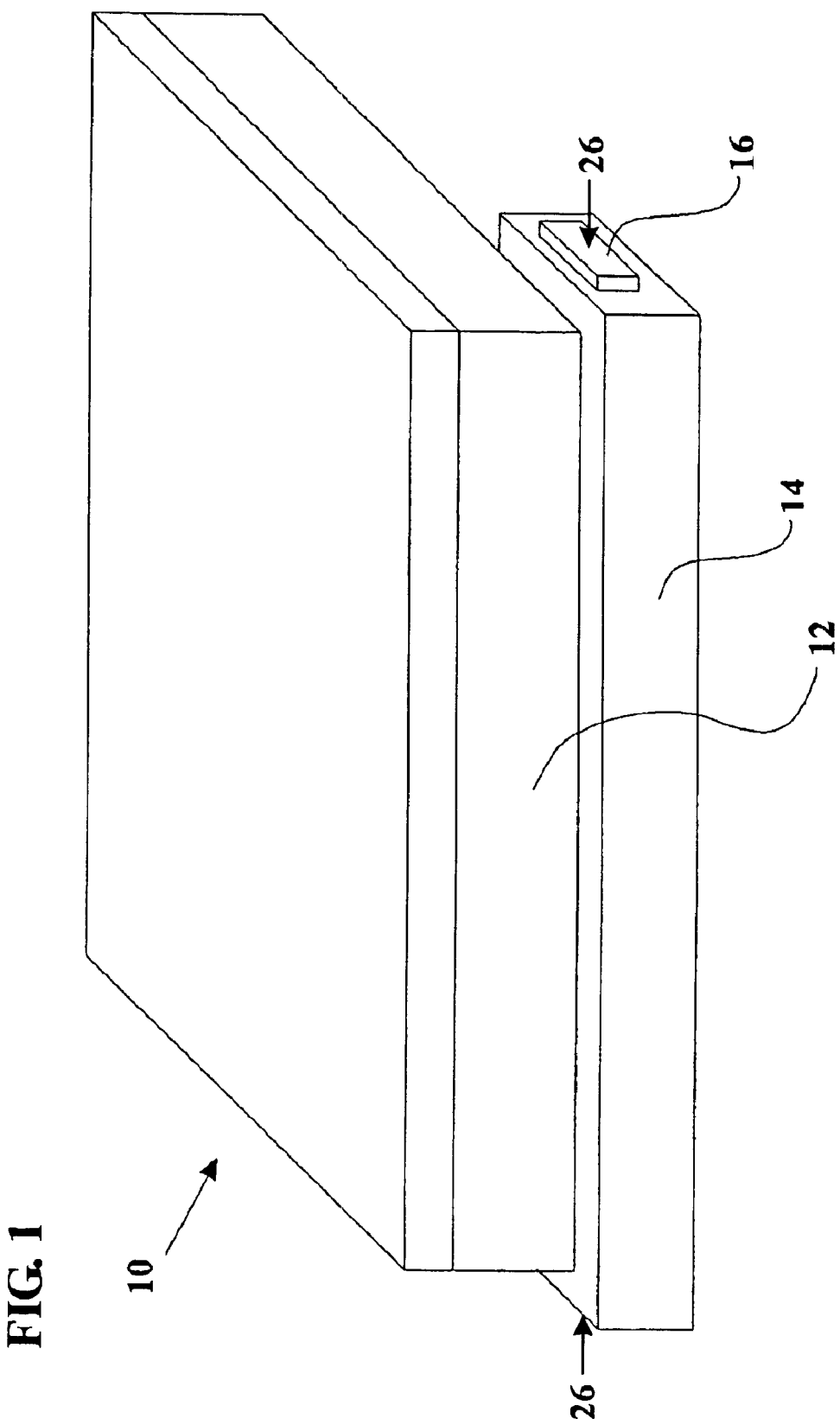
FIG. 1 is a perspective view of a portable computing device docked to an attachable expansion device having an exemplary multistage undocking assembly of the present technique.

The present technique provides a multistage undocking assembly, which has an unlatching stage and a separation stage. Certain aspects of the present technique have been incorporated into a computer system 10, which comprises a portable computing device 12 dockable with an attachable expansion device 14, as illustrated in FIG. 1. The portable computing device 12 may be a notebook computer, a laptop computer, a handheld/palm computer, a tablet computer, or any other dockable portable device. Accordingly, the portable computing device 12 may comprise a variety of computing components, such as a motherboard, one or more processors, random access memory (RAM), one or more hard disk drives, a floppy disk drive, a CD/DVD drive, a network card, a modem, a keyboard, a pointing device (e.g., a touch pad), communication ports, a display screen, and a variety of other circuitry and components. The attachable expansion device 14 may be a port replicator, a docking station, or any other such docking device having a variety of expansion components. For example, the attachable expansion device 14 may include communication ports, PCMCIA card slots, network support, and various other circuitry and components.

Figure 2:
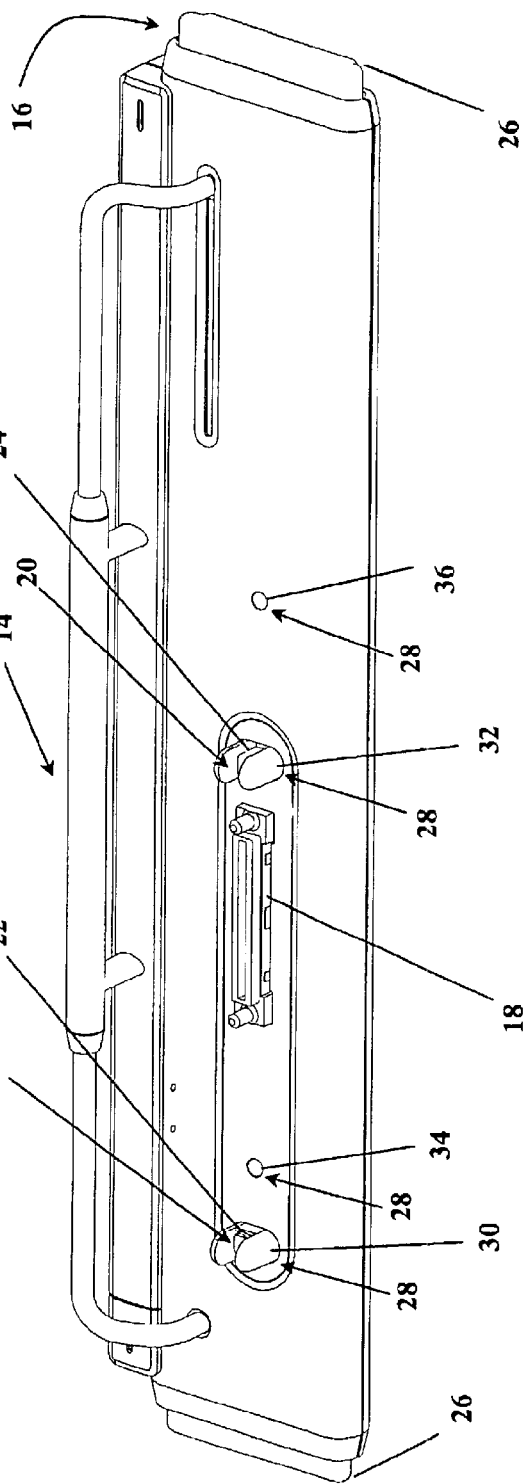
FIG. 2 is a rear perspective view of the attachable expansion of FIG. 1.

As discussed in further detail below, the portable computing device 12 is undockable from the attachable expansion device 14 via a multistage undocking assembly 16. FIG. 2 is a top perspective view of the attachable expansion device 14 illustrating an exemplary embodiment of the multistage undocking assembly 16. As illustrated, the attachable expansion device 14 comprises a communication port 18 coupleable with a mateable communication port on the portable computing device 12. In a docked position, as illustrated in FIG. 1, the communication port 18 and mateable communication port may be removably secured together via a retaining force, such as a compressive fit or frictional force between the mated ports. For example, a frictional or compressive force may exist at each electrical contact between the mated ports. The attachable expansion device 14 also has a mechanical attachment assembly 20, which is removably securable with a mateable latch assembly on the portable computing device 12. Although any suitable releasable attachment mechanism is within the scope of the present technique, the mechanical attachment assembly 20 has a pair of latch assemblies 22 and 24 movable between latched and unlatched positions.

As noted above, the multistage undocking assembly 16 facilitates unlatching and separation of the portable computing device 12 from the attachable expansion device 14 in different stages. As illustrated in FIG. 2, the multistage undocking assembly 16 has an engagement mechanism or trigger 26 (e.g., buttons) operably coupled to a device separation mechanism 28, which comprises a pair of spring-loaded lifters 30 and 32 and manually forced lifters 34 and 36. In the illustrated embodiment, the spring-loaded lifters 30 and 32 are disposed in a releasable relationship with the respective latch assemblies 22 and 24, while the manually forced lifters 34 and 36 are disposed apart from the respective latch assemblies 22 and 24. However, the device separation mechanism 28 may have any suitable number, type, and configuration of spring-loaded and/or manually forced lifter mechanisms, which may comprise a plurality of separate members or an integral assembly. For example, the device separation mechanism 28 may comprise a solenoid, a hydraulic assembly, a motor-driven geared assembly, or any other mechanism suitable for multi-stage unlatching and separation of the portable computing device 12 from the attachable expansion device 14.

In an undocked configuration of the attachable expansion device 14, the latch assemblies 22 and 24 are disposed in the unlatched position, wherein the spring-loaded lifters 30 and 32 are released from the respective latch assemblies 22 and 24 and are expanded to a springably lifted position. The manually forced lifters 34 and 36 are unengaged in this unlatched position. As the portable computing device 12 is lowered onto the attachable expansion device 14, the communication port 18 engages the mateable communication port and the spring-loaded lifters 30 and 32 compress downwardly toward a docked position. At the docked position, the spring-loaded lifters 30 and 32 release the respective latch assemblies 22 and 24. The latch assemblies 22 and 24 then move springably from the unlatched position to the latched position to secure the portable computing device 12 to the attachable expansion device 14.

In a docked configuration, the multistage undocking assembly 16 facilitates a smooth unlatching and separation of the portable computing device 12 from the attachable expansion device 14. In a first undocking stage, the user presses the triggers 26 to engage the device separation mechanism 28, which moves the latch assemblies 22 and 24 outwardly from the latched position to the unlatched position. In the unlatched position following the first undocking stage, the portable computing device 12 is unlatched and free to separate from the attachable expansion device 14. In one embodiment, the device separation mechanism 28 releases the spring-loaded lifters 30 and 32 in a second undocking stage. In another embodiment, the device separation mechanism 28 releases the spring-loaded lifters 30 and 32 in the first undocking stage. In either embodiment, the spring force of the spring-loaded lifters 30 and 32 is insufficient to effectuate a separation of the portable computing device 12 from the attachable expansion device 14. For example, the spring force is less than the combined weight of the portable computing device 12, the frictional forces between connectors (e.g., the mated communication ports), and so forth.

In a second undocking stage, the user continues pressing the triggers 26 to engage the device separation mechanism 28, which then engages the manually forced lifters 34 and 36. The device separation mechanism 28 uses the force exerted by the user to lift the manually forced lifters 34 and 36 from an unlifted state to a lifted state, thereby providing the lifting force to separate the portable computing device 12 from the attachable expansion device 14. Accordingly, the manually forced lifters 34 and 36 overcome any frictional or compressive force between mated connectors and communication ports. The spring-loaded lifters 30 and 32 also complement the manual force provided by the manually forced lifters 34 and 36 during the second undocking stage. At the end of the second undocking stage, the spring-loaded lifters 30 and 32 springably support the portable computing device 12 in the lifted position.

Figure 3:
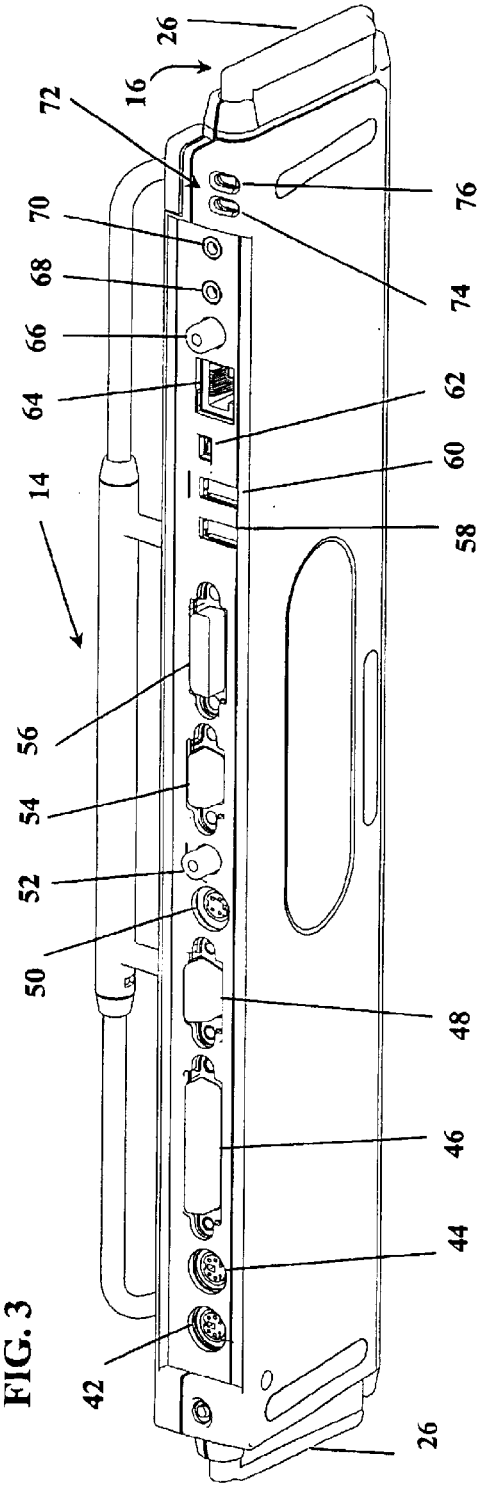
FIG. 3 is a front perspective view of the attachable expansion device of FIG. 1.

As illustrated in FIG. 3, the attachable expansion device 14 comprises a variety of expansion ports, such as input/output ports 42–70. These expansion ports 42–70 may comprise PS/2 ports, parallel ports, serial ports, monitor ports, audio/video ports, USB ports, wireless ports, optical ports, modem ports, network ports, or any other desired communication ports. The attachable expansion device 14 also may include a security mechanism 72, such as lock ports 74 and 76, which may be coupled to a desired fixture. In an exemplary embodiment, the security mechanism 72 is operably coupled to the multistage undocking assembly 16 to facilitate additional security between the portable computing device 12 and the attachable expansion device 14. For example, one of the lock ports 74 and 76 may have a lockdown mechanism coupled to the multistage undocking assembly 16, such that engagement with the respective port secures the multistage undocking assembly 16 in a docked configuration. As discussed above, the attachable expansion device 14 also may comprise a variety of expansion components and circuitry. For example, the attachable expansion device 14 may include a processor, memory, a disk drive, a network card, a modem, a wireless communication card, and so forth.

As illustrated in FIGS. 4 and 5, the multistage undocking assembly 16 has engagement assemblies 78 and 80 to facilitate the unlatching and separation of the portable computing device 12 from the attachable expansion device 14 in multiple stages. The triggers 26 are operably coupled to the mechanical attachment assembly 20 and the device separation mechanism 28 via the engagement assemblies 78 and 80. In operation, the user presses triggers 26 to move the engagement assemblies 78 and 80 laterally inward through the attachable expansion device 14. The engagement assemblies 78 and 80 include latch release members 82 and 84 to release the latch assemblies 24 and 22, respectively. Upon release, the latch assemblies 22 and 24 move to a nonobstructing position relative to the spring-loaded lifters 30 and 32, which are then springably forced upward via spring assemblies 86 and 88, respectively. The spring assemblies 86 and 88 may use any suitable spring having a spring force selected to support the weight of the portable computing device 12. Yet, the spring force may be insufficient to overcome retaining forces holding the portable computing device 12 to the attachable expansion device 14. The spring assemblies 86 and 88 also may have spring force adjustment mechanism, which allow a closer match of the spring force to the weight of the particular portable computing device 12. The spring force adjustment mechanism also may comprise an automatic weight analysis mechanism, which facilitates an automatic spring adjustment based on the weight of the portable computing device 12.

The engagement assemblies 78 and 80 of FIGS. 4 and 5 also include manual engagement members 90 and 92, which interact with mating engagement members 94 and 96 of the manually forced lifters 36 and 34, respectively. As illustrated, the engagement members 90 and 94 interact at wedge-shaped or cam-shaped interaction surfaces 98, while the engagement members 92 and 96 interact at wedge-shaped or cam-shaped interaction surfaces 100. In operation, the wedge-shaped or cam-shaped interaction surfaces 98 and 100 force the lifters 36 and 34 to rise upward in a lifting motion as the user applies a manual force against the triggers 26 and the engagement assemblies 78 and 80, respectively. Upon release of the triggers 26, return springs 102 and 104 force the manually forced lifters 36 and 34 respectively back to unlifted positions.

Figure 6:
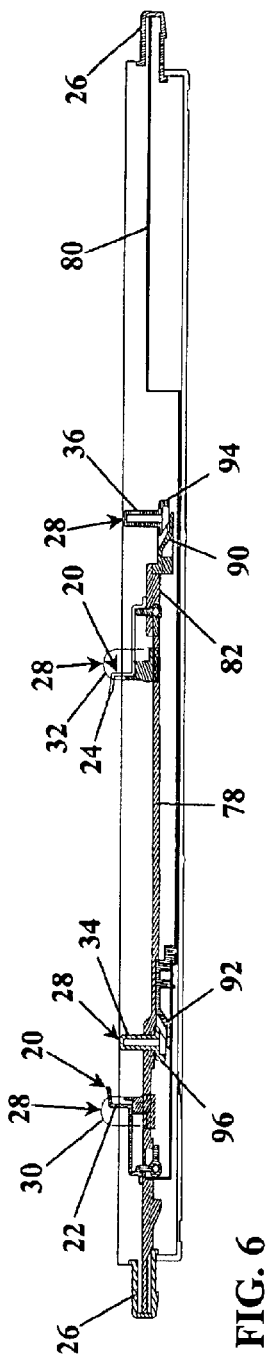
FIGS. 6–8 are partial cross-sectional side views of the attachable expansion device of FIGS. 1–5 illustrating stages of the multistage undocking assembly.
Figure 7:
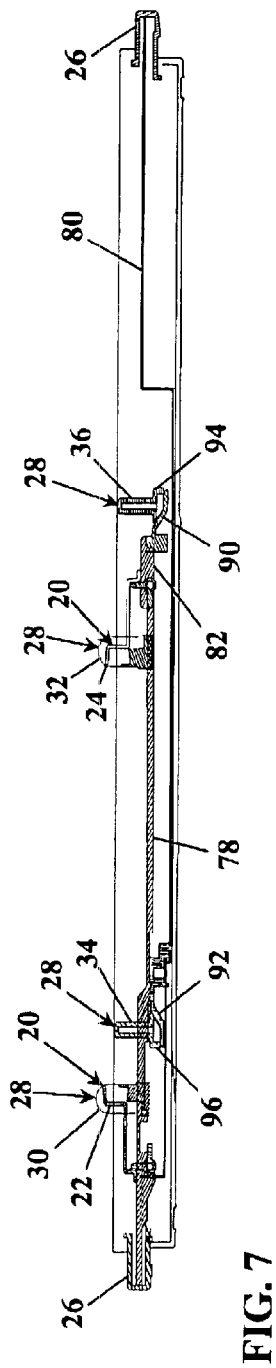
Figure 8:
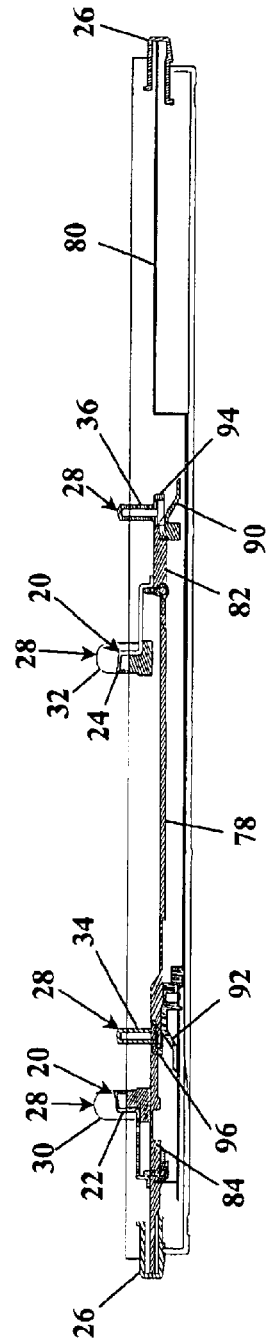

The multiple stages of the multistage undocking assembly 16 are further illustrated with reference to FIGS. 6–8. As illustrated in FIG. 6, the latch assemblies 22 and 24 are disposed in latched positions, while the spring-loaded lifters 30 and 32 and the manually forced lifters 34 and 36 are disposed in unlifted positions. In the illustrated docked configuration, the portable computing device 12 is mechanically and communicatively coupled to the attachable expansion device 14.

As the user presses the triggers 26 in the first undocking stage, the engagement assemblies 78 and 80 move the latch assemblies 24 and 22 to unlatched positions via movement of latch release members 82 and 84, respectively. FIG. 7 illustrates an unlatched configuration of the attachable expansion device 14 at the end of the first undocking stage. As illustrated, the latch assemblies 22 and 24 are disposed in the unlatched positions, while the spring-loaded lifters 30 and 32 and the manually forced lifters 34 and 36 remain in the unlifted positions. In this exemplary embodiment, the spring force of the spring assemblies 86 and 88 is insufficient to overcome the combined weight of the portable computing device 12 and the retaining forces (e.g., friction) between the portable computing device 12 and the attachable expansion device 14. Accordingly, the portable computing device 12 remains seated on the attachable expansion device 14 after being unlatched in the first undocking stage.

As the user continues pressing the triggers 26 from the first undocking stage to the second undocking stage, the engagement assemblies 78 and 80 move the manually forced lifters 36 and 34 to lifted positions via movement of manual engagement members 90 and 92 against mating engagement members 94 and 96, respectively. In the process of raising lifters 34 and 36, the spring-loaded lifters 30 and 32 also rise to lifted positions. Again, the spring-loaded lifters 30 and 32 may have insufficient spring force to lift the portable computing device 12 without the manually forced lifters 34 and 36. However, spring-loaded lifters 30 and 32 complement the manual lifting force provided by the manually forced lifters 34 and 36. Together, the spring-loaded lifters 30 and 32 and the manually forced lifters 34 and 36 provide a separation force sufficient to separate the portable computing device 12 from the attachable expansion device 14. FIG. 8 illustrates an unlatched and lifted configuration of the attachable expansion device 14 at the end of the second undocking stage. As illustrated, the latch assemblies 22 and 24 are disposed in the unlatched positions, while the spring-loaded lifters 30 and 32 and the manually forced lifters 34 and 36 are disposed in lifted positions via a spring force and a manual force, respectively. Upon separation of the portable computing device 12 from the attachable expansion device 14, the user disengages the triggers 26 and the associated engagement assemblies 78 and 80. In this exemplary embodiment, the multistage undocking assembly 16 returns the manually forced lifters 34 and 36 to the unlifted positions, while the spring-forced lifters 30 and 32 remain in the lifted positions. Accordingly, the spring-loaded lifters 30 and 32 support the portable computing device 12 in the lifted positions.

As described in detail above, the multistage undocking assembly 16 provides a relatively smooth undocking motion, which avoids abrupt and noisy undocking of the portable computing device 12 from the attachable expansion device 14. The application of the manually forced lifters 34 and 36 reduces the requisite spring force needed by the spring-loaded lifters 30 and 32, thereby reducing friction and abrupt eject motions in the undocking assembly. Although specific latch and lifter mechanisms are illustrated in the foregoing figures, any suitable latch and lifter mechanisms are within the scope of the present technique. For example, the lifter mechanism may comprises pop-up ejectors, hinged separation members, twisting or threaded lifters, or any other suitable mechanism for ejecting, lifting, or generally separating the portable computing device 12 from the attachable expansion device 14. Moreover, multistage undocking assembly may be disposed in the portable computing device 12 and/or the attachable expansion device 14.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims. For example, the foregoing multistage undocking mechanisms are applicable to a variety of docking attachment/release mechanisms, portable computers, docking stations, port replicators, and other devices.

What is claimed is:

1. A docking system for a portable computing system, comprising:
 a docking mechanism, comprising:
  a docking latch mechanism; and
  a dock eject mechanism, comprising:
   an engagement mechanism;
   a spring-loaded dock eject mechanism; and
   a manually forced ejector mechanism, wherein the docking latch mechanism and the manually forced ejector mechanism are operably coupled to the engagement mechanism, wherein the manually forced ejector mechanism comprises multiple lifters, each disposed adjacent a cam portion of the engagement mechanism.

2. The docking system of claim 1, wherein the spring-loaded dock eject mechanism is disposed about the docking latch mechanism.

3. The docking system of claim 1, wherein the spring-loaded dock eject mechanism comprises a spring of sufficient force to support the portable computing system.

4. The docking system of claim 3, wherein the spring has insufficient force to overcome friction between communication connectors disposed on the docking mechanism and the portable computing system.

5. The docking system of claim 4, wherein the manually forced ejector mechanism is adapted to overcome the friction.

6. The docking system of claim 1, wherein the manually forced ejector mechanism comprises the spring-loaded dock eject mechanism.

7. The docking system of claim 1, wherein the docking latch mechanism comprises multiple latches disposed about a dockable communication connector.

8. The docking system of claim 1, wherein the engagement mechanism comprises at least one button.

9. A docking system for a portable computing system, comprising:
    a docking latch mechanism adapted to latch the portable computing device releasably to an expansion base;
    a manually forced separator mechanism adapted to separate the portable computing device from the expansion base;
    a spring-loaded lifter adapted to lift the portable computing device from the expansion base; and
    a multistage undocking mechanism engageable with the docking latch mechanism in an unlatching stage and engageable with the manually forced separator mechanism in a separating stage.

10. The docking system of claim 9, wherein the spring-loaded lifter is operable in the separating stage.

11. The docking system of claim 10, wherein the spring-loaded lifter comprises a spring of sufficient force to support the portable computing system in an unlatched and lifted position.

12. The docking system of claim 11, wherein the spring has insufficient force to separate the portable computing system from the expansion base.

13. The docking system of claim 10, wherein the spring-loaded lifter has a spring force adjustment mechanism.

14. The docking system of claim 9, wherein the docking latch mechanism comprises multiple latches disposed about a dockable communication connector.

15. The docking system of claim 9, wherein the manually forced separator mechanism comprises multiple lifters in positions adapted to balance forces associated with undocking the portable computing system.

16. The docking system of claim 9, wherein the docking latch mechanism, the manually forced separator mechanism, and the multistage undocking mechanism are disposed in the portable computing system.

17. The docking system of claim 9, wherein the docking latch mechanism, the manually forced separator mechanism, and the multistage undocking mechanism are disposed in the expansion base.

18. A docking system for a portable computing system, comprising:
    means for releasably latching the portable computing system to an expansion device, wherein the means for releasably latching comprises a spring-loaded lifter;
    means for manually separating the portable computing system from the expansion device;
    means for springably assisting the separating means and for springably supporting the portable computing system in an unlatched and lifted position; and
    means for unlatching the docking latch mechanism in an unlatching stage and for subsequently separating the portable computing system in a separating stage.

19. The docking system of claim 18, wherein the means for releasably latching, the means for separating, the means for springably assisting, and the means for unlatching are disposed in the portable computing system.

20. The docking system of claim 18, wherein the means for releasably latching, the means for separating, the means for springably assisting, and the means for unlatching are disposed in the expansion device.

21. A method of undocking a portable computing device from an expansion device, comprising the acts of:
    moving a multistage undocking mechanism to a first position in which the portable computing device is unlatched from the expansion device; and
    extending the multistage undocking mechanism from the first position to a second position to separate the portable computer from the expansion device at least partially via a manual separation mechanism; and
    releasing a spring-loaded lifter to lift the portable computer from the expansion device.

22. The method of claim 21, wherein the act of moving comprises the act of releasing a pair of docking latches.

23. The method of claim 21, wherein the act of moving comprises the act of sliding a latch member frictionally along the spring-loaded lifter.

24. The method of claim 21, wherein the act of extending comprises the act of manually forcing a lifter portion of the manual separation mechanism to extend outwardly from the expansion device between the expansion device and the portable computing device.

25. The method of claim 24, wherein the act of manually forcing the lifter portion comprises the act of overcoming a friction force between mated connectors on the portable computing device and the expansion device.

26. The method of claim 21, wherein the act of releasing comprises the act of providing a spring force sufficient to support the portable computing device but insufficient to separate the portable computing device from the expansion device.

27. The method of claim 26, wherein the act of extending comprises the act of manually supplementing the force of the spring-loaded lifter to separate the portable computing device from the expansion device.

28. The method of claim 21, wherein the acts of moving and extending the multistage undocking mechanism comprise the act of depressing buttons disposed on opposite sides of the expansion device inwardly toward one another.

29. A method of making a docking mechanism for a portable computing device, comprising the acts of:
    providing a docking latch mechanism having latched and unlatched positions;
    providing a spring-loaded lifter that is operable in the unlatched position;
    providing a manually forced lifter mechanism having lifted and unlifted positions; and
    operably coupling a multistage undocking mechanism to the docking latch mechanism and the manually forced separator mechanism to effectuate the unlatched and lifted positions in first and second stages of the multistage undocking mechanism, respectively.

30. The method of claim 29, wherein the acts of providing the docking latch mechanism, providing the manually forced lifter mechanism, and operably coupling the multistage undocking mechanism comprise the act of assembly a docking device that is dockable with the portable computing device.

31. The method of claim 29, wherein the acts of providing the docking latch mechanism, providing the manually forced lifter mechanism, and operably coupling the multistage undocking mechanism comprise the act of disposing the docking mechanism in the portable computing device.

32. The method of claim 29, wherein the act of providing the spring-loaded lifter comprises the act of positioning a latch member in slidable engagement with the spring-loaded lifter between the latched and unlatched positions.

33. The method of claim 29, wherein the act of providing the spring-loaded lifter comprises the act of selecting a spring having a spring force based on the weight of the portable computing device.

34. The method of claim 29, wherein the act of providing the spring-loaded lifter comprises the act of selecting a spring having a force insufficient for separating the portable computing device from a docking device.

35. The method of claim 34, wherein the act of providing the manually forced lifter mechanism comprises the act of creating a manual force mechanism to supplement the spring force.

36. The method of claim 29, wherein the act of operably coupling the multistage undocking mechanism comprises the act of positioning a lateral engagement mechanism in an engageable position relative to the docking latch mechanism and the manually forced lifter mechanism.

37. The method of claim 36, wherein the act of positioning the lateral engagement mechanism comprises the act of coupling a pair of buttons to the lateral engagement mechanism in which the buttons are inwardly engageable toward one another.

* * * * *